United States Patent [19]

Ruehl et al.

[11] Patent Number: 4,626,633
[45] Date of Patent: Dec. 2, 1986

[54] IN-LINE SWITCHED TELEPHONE LINE TESTER

[75] Inventors: William E. Ruehl, Wheeling; E. Grant Swick, Bartlett, both of Ill.

[73] Assignee: Illinois Tool Works, Inc., Chicago, Ill.

[21] Appl. No.: 698,068

[22] Filed: Feb. 4, 1985

[51] Int. Cl.$^4$ ............................................. H04B 3/46
[52] U.S. Cl. ........................................ 379/27; 379/19
[58] Field of Search ................ 179/175.3 R, 175.3 F, 179/175, 175.1 R; 324/133

[56] References Cited

U.S. PATENT DOCUMENTS 3,976,849  8/1976  Champan ..................... 179/175.3 R
4,373,120  2/1983  McDonald ........................ 179/81 C
4,564,728  1/1986  Romano ....................... 179/175.3 R Primary Examiner—Stafford D. Schreyer
Attorney, Agent, or Firm—A. J. Brunett; J. P. O'Brien; T. W. Buckman

[57] ABSTRACT

A switched telephone tester comprises a tester body defining a connector portion of complementary configuration for receiving a modular telephone plug, a light emitting element responsive to a given voltage for emitting light, and a switch coupled with the tester body and with the light emitting element and movable relative to the tester body to a first position for placing the light emitting element in electrical circuit across tip and ring contacts of the modular telephone plug and a second position for taking the light emitting means out of circuit across the tip and ring contacts, to thereby test for the presence of a voltage across the tip and ring contacts.

13 Claims, 8 Drawing Figures

U.S. Patent  Dec. 2, 1986  Sheet 1 of 2  4,626,633
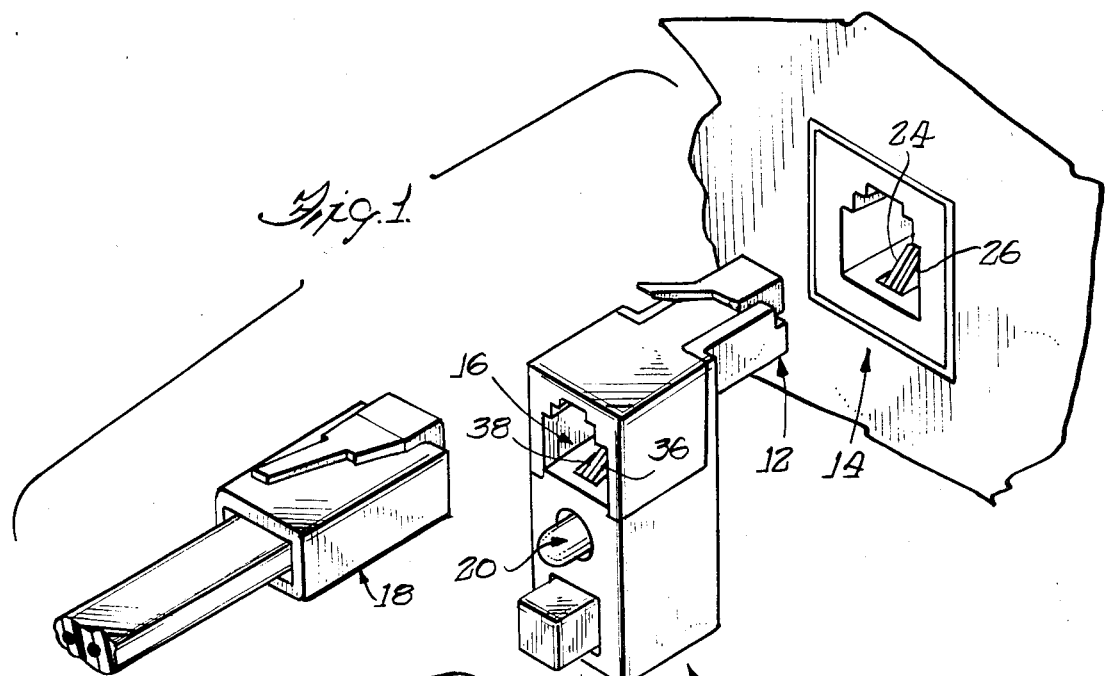
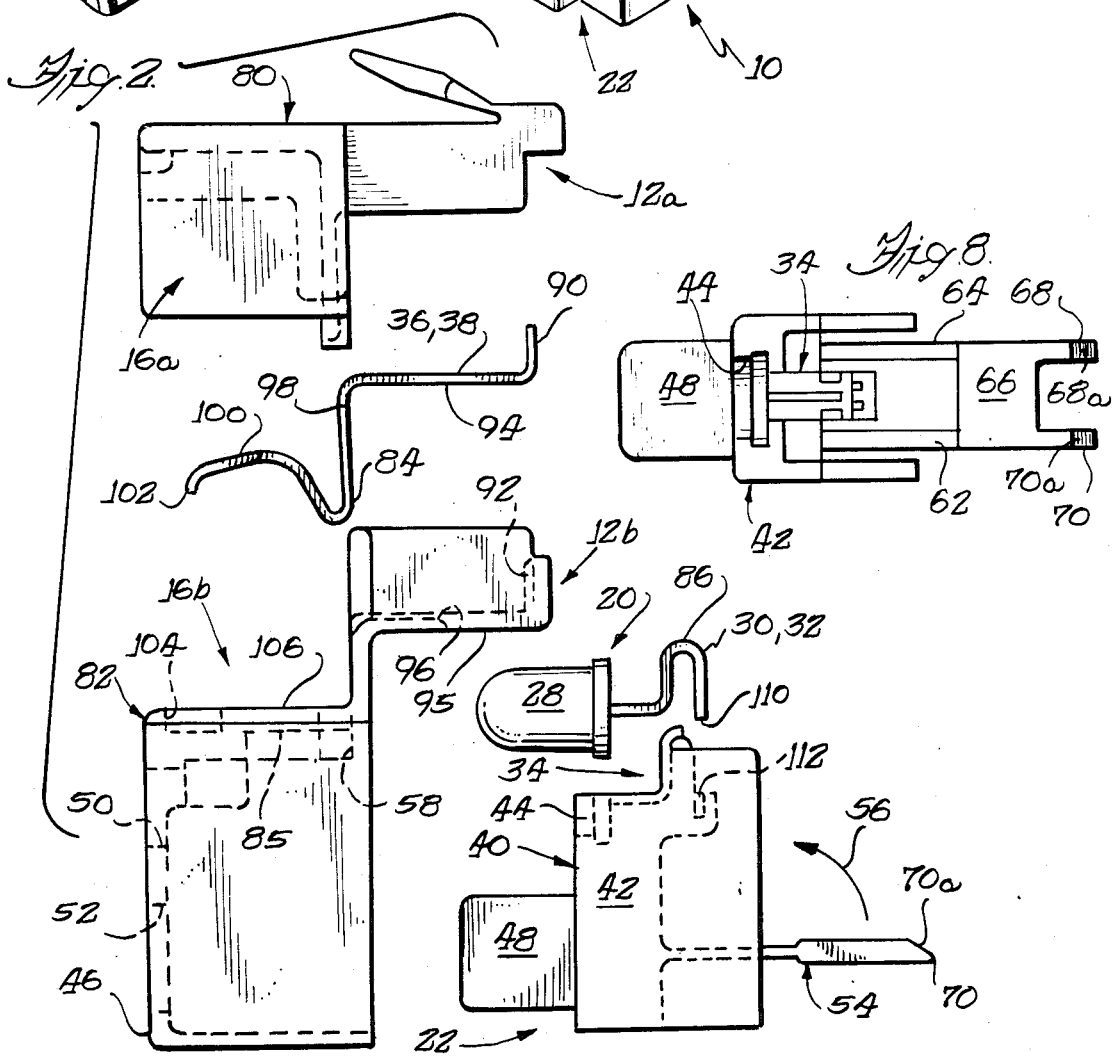

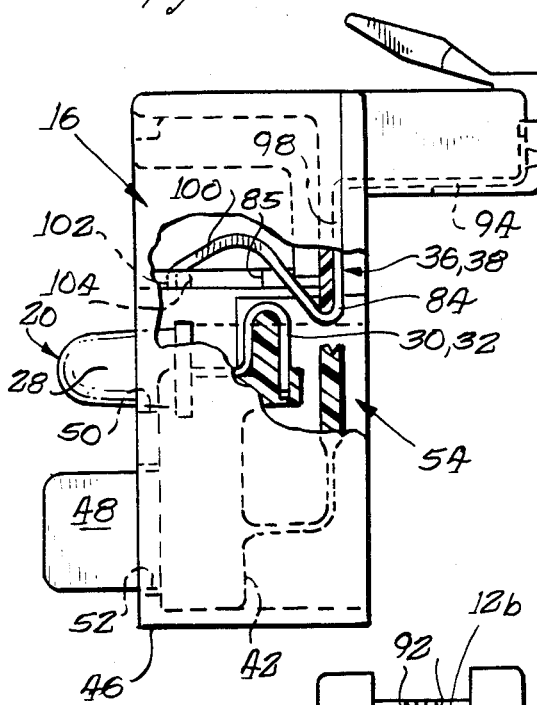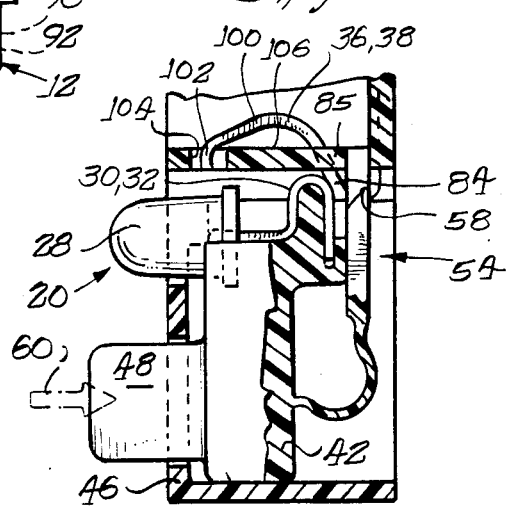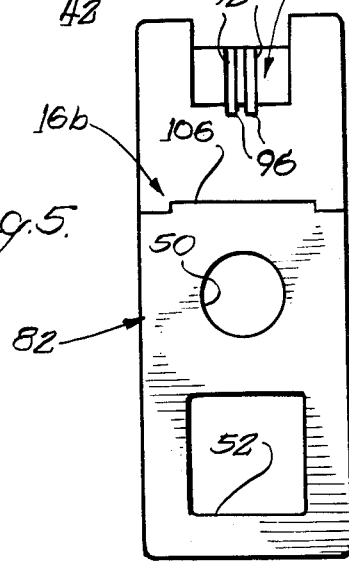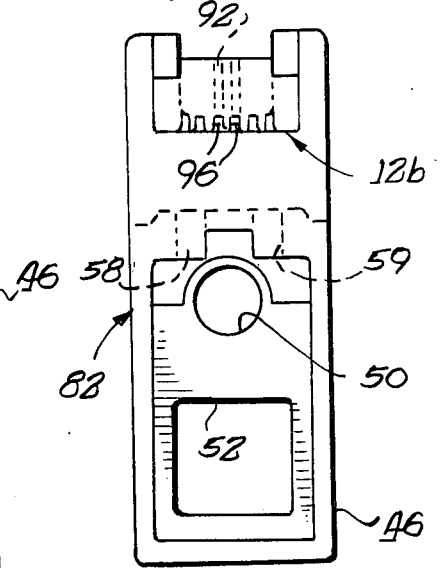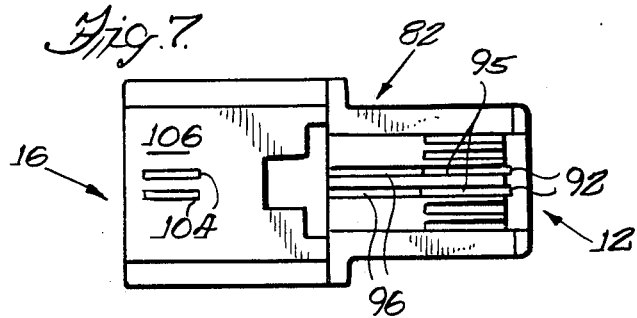

IN-LINE SWITCHED TELEPHONE LINE TESTER

BACKGROUND OF THE INVENTION

This invention is directed generally to telephone line test apparatus and more particularly to a novel in-line switched telephone line tester which may be interposed intermediate a modular telephone plug of an incoming line and a modular telephone jack of inside equipment, such as a private business exchange (PBX) system, which normally receives the incoming line directly, for testing the tip-ring polarity of the incoming line.

Briefly, modular telephone equipment currently in use utilizes a modular telephone receptacle or "jack" or socket capable of accepting a complementary modular telephone plug. Such a modular plug can be readily disconnected and connected to another similar modular jack at another location if desired. Certain telephone equipment, particularly of the "Touch-Tone" type, requires that the terminals or contacts of each receptacle or modular jack and its mating plug maintain the same, predetermined positive-to-negative polarity. More specifically, the polarity of the tip-ring voltage at the subscriber's end must be maintained with respect to the polarity thereof at the central office equipment. That is, a proper tip-ring voltage of proper polarity should appear at the incoming line to the customer's equipment.

It is possible that such modular plugs may inadvertently be miswired such that the tip-ring polarity contacts of the mating jack or receptacle are wired in the reverse polarity. Particularly with the advent of increasing customer or consumer purchased and owned and/or customer or consumer installed or PBX telephone equipment, such miswiring may occur. Moreover, it is important to determine whether any malfunctioning line is due to a malfunction in the customer-owned PBX equipment or in the incoming line, and hence the responsibility of the telephone service provides. Further in this regard, it is possible that one of the tip or ring lines leading to the tip and ring contacts may be inadvertently broken, disconnected or possibly improperly connected to a terminal or contact other than its intended tip or ring terminal or contact.

Accordingly, it is a general object of the invention to provide a novel and improved in-line, switched telephone line tester for quickly and easily testing for the proper tip-ring voltage and polarity of an incoming line at a modular telephone jack input to inside equipment such as PBX system. In this regard, by "in-line" is meant that the tester may be placed in the modular telephone jack and will additionally accept a mating modular telephone plug of the incoming line, so that the PBX system may be simultaneously connected with the incoming line through the tester. By "switched" is meant that testing of the incoming line may be accomplished when desired by "switching" a test portion of the tester into circuit therewith.

Broadly speaking, the concept of testing of the tip-ring polarity of telephone receptacles or modular jacks is known, as shown for example in U.S. Pat. No. 4,209,671 to Charles, et al. and U.S Pat. No. 4,373,120 to McDonald. The devices of both of these patents utilize as an indicator a lamp or other light-emitting element of a type which requires that a further element such as a diode be additionally connected or coupled across the tip-ring lines during testing. This is done to complete the circuit and/or to assure that only the proper polarity of the tip-ring voltage will cause the indicator lamp or other element to light.

Additionally, the device shown in the patent to Charles et al. further includes a battery for testing the phone jack even in the absence of a connection thereof to the central office. This battery is intended to replace the tip-ring voltage normally provided from the central office or other outside equipment. Accordingly, the device of Charles et al. can test only for continuity of the wiring or proper connection of the tip-ring wires or lines, and not for the presence and proper polarity of the tip-ring voltage from the central office or other outside equipment.

The Charles et al. device further requires that the additional diode mentioned above be coupled to the line at some point removed from the modular jack or receptacle being tested. For example, the disclosure suggests connecting this diode near a station protector located near the entrance of the phone line to the subscriber's location or even back at the central office location. Moreover, the device of the Charles et al. patent is intended for use only as a test device and must be disconnected from the line prior to connection of other telephone equipment therewith. That is, there is no provision for connection of other telephone equipment to the line when the test device is connected therewith.

The McDonald patent additionally requires that a resistor element of a predetermined value be coupled in circuit with the diode and light emitting device (which is disclosed as the neon tube) so as to provide a characteristic "signature" or signal. This latter signal is recognizable by the telephone central office equipment for purposes of making a continuity test on a subscriber line from the central office. Hence, the McDonald patent does not comtemplate on-site testing of the incoming line. Additionally, while the McDonald device permits connection of a normal telephone receiver to the modular jack with the testing device in place, the disclosure indicates that the testing device will not operate when a ringing voltage is applied to the line if a telephone receiver ringing circuit is connected to the line.

Moreover, neither of these patents discloses a switched tester apparatus. That is, the disclosed devices proceed to carry out the telephone line test and give appropriate indication when plugged into the receptacle or modular jack. These patents do not contemplate any means for selectively testing the tip-ring contacts only at periodic intervals or only when desired. In contrast, the tester of the invention is further a switched device as indicated above, such that the testing portion thereof may be switched into and out of circuit with the tip-ring contacts as desired. In view of the switched, in-line nature of the tester of the invention, it may advantageously be left coupled intermediate a modular jack of the PBX system and the modular plug of the incoming telephone line at all times, with the test indication only being given when desired.

OBJECTS AND SUMMARY OF THE INVENTION

Accordingly, it is a general object of the invention to provide a novel and improved telephone line tester.

A more specific object is to provide a switched telephone line tester which is capable of providing an indication of the presence or absence of a tip-ring voltage at an incoming telephone line, as well as the polarity of the voltage when desired without requiring the connection of further circuit elements across the tip-ring lines. A further object is to provide a tester in accordance with the foregoing objects which is also an in-line tester for maintaining telephone equipment connected to the incoming line, if desired.

A related object is to provide an in-line, switched telephone tester in accordance with the foregoing objects which is relatively simple and inexpensive in its design and manufacture and yet highly reliable in operation.

Briefly, and in accordance with the foregoing objects, a switched telephone tester in accordance with the invention comprises a tester body defining a connector portion of complementary configuration for receiving a modular telephone plug; light emitting means responsive to a given voltage for emitting light, and switching means coupled with said tester body and with said light emitting means and movable to a first position for placing said light emitting means in electrical circuit across tip and ring contacts of said modular telephone plug and a second position for taking said light emitting means out of circuit across said tip and ring contacts, to thereby test for the presence of a voltage across said tip and ring contacts.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIG. 1 is an exploded perspective view of a in-line switched telephone line tester in accordance with the invention in conjunction with a modular telephone jack and a modular telephone plug;

FIG. 2 is an enlarged exploded side elevation of the in-line switched telephone line tester of the invention in an unassembled condition;

FIG. 3 is a side elevation, partially broken away and partially in section, of the assembled in-line switched telephone line tester of the invention;

FIG. 4 is a partial side elevation similar to FIG. 3, showing a moved position of a pushbutton body portion thereof;

FIG. 5 is a front elevation of a lower body portion of the in-line switched telephone line tester of the invention;

FIG. 6 is a rear elevation of the lower body portion of FIG. 4;

FIG. 7 is a top plan view of the lower body portion of FIGS. 5 and 6; and

FIG. 8 is a top plan view of a pushbutton body portion of the in-line switched telephone line tester of the invention.

DETAILED DESCRIPTION OF THE ILLUSTRATED EMBODIMENT

Referring now to the drawings and initially to FIGS. 1 and 2, an in-line, switched telephone tester apparatus is designated generally by the reference numeral 10. This apparatus 10 generally comprises a tester body which defines a male connector portion 12 of complementary configuration for insertion into a modular telephone jack 14 for example, an input to a PBX system. A female connector portion 16 is of complementary configuration for receiving a modular telephone plug 18, for example, from an incoming telephone line. Light emitting means or a light emitting element 20 is mounted to the tester body 10 and is responsive to a given voltage for emitting light.

In accordance with the invention, novel switching means designated generally by reference numeral 22 are coupled with the tester body 10 and with the light emitting element 20, as will be more fully described later. This switching means 22 is movable between a first position for placing the light emitting means in electrical circuit across tip and ring contacts 24, 26 of the modular telephone plug 18 and to a second position for taking the light emitting element out of circuit across these tip and ring contacts. Accordingly, the tester 10 is adapted to selectively test for the presence of a voltage across tip and ring contacts of modular phone plug 18 and hence of the incoming line whenever the switching element or means 22 is actuated to its first or "test" position.

The light emitting means, referring to FIG. 2, will be seen to comprise a light body 28 and a pair of leads 30, 32 extending from the body 28. The switching means includes guide means designated generally by reference numeral 34 for guiding or shaping said leads into a predetermined alignment or position. This alignment or position is one for electrically conductive contact of the leads with the tip and ring contacts, in a manner which will be seen presently, in response to movement of the switching means 22 to its first or test position.

In the illustrated embodiment, the light emitting element or means 20 comprises a light emitting diode (LED), and preferably a bipolar LED of the type adapted to emit light of a first color in response to a voltage of one polarity thereacross and a light of a second color in response to a voltage of reverse polarity thereacross. In the illustrated embodiment, the leads 30 and 32 are guided or positioned by guide means 34 such that the LED 20 will emit a green light when a voltage of the correct or desired polarity is present across the tip and ring contacts 24, 26, and emit a red light when a voltage of incorrect or reversed polarity is present thereacross.

Referring now more particularly to FIGS. 2 through 4, it will be seen that the previously mentioned switching means 22 further includes electrical contact means comprising a pair of similar, elongate flat, spring-like electrical conductor or wire members 36, 38. These conductors 36, 38 are positioned in alignment with the male and female connector portions 12, 16 for engaging the tip and ring contacts 24, 26 of the modular phone jack 14, and also tip and ring contacts of the modular telephone plug 18. To this end, the electrical contact elements 36 and 38 are positioned and shaped to extend through the tester body 10 from the female connector portion 16 to the male connector portion 12. More particularly, the contacts or wire conductor members 36 and 38 extend along a lower, inner surface of the female connector portion 16 and a lower outer surface of the male connector portion 12.

The switching means 22 also includes pushbutton means comprising a pushbutton body 42 having mounting means in the form of a recess 44 for receiving or mounting the light or LED body 28. This body 42 also defines thereon the previously mentioned guide means 34 for guiding the leads into a predetermined alignment relative to the electrical contact means or wire conductors 36 and 38. The pushbutton body is movably mountable to the tester body for movement between the aforementioned first and second positions.

As illustrated in FIG. 3, in the second position, the elongate leads 30, 32 of the light emitting means or LED 20 are out of electrically conductive contact with the electrical contact means or wires 36, 38. However, as illustrated in FIG. 4 when a pushbutton body is in a second position, the leads 30 and 32 are in electrically conductive contact with the electrical contact means 36 and 38. In this regard, the tester body 10 defines a housing portion 46 for slideably receiving or mounting the pushbutton body 42.

Referring in more detail to the foregoing parts, the pushbutton body 42 will be seen to further comprise an outwardly extending pushbutton 48. The recess or mounting means 44 receives a portion of the LED body 28 with the remaining portion thereof extending outwardly of the pushbutton body 42. Cooperatively, the housing portion 46 includes a pair of through apertures 50, 52 for slideably receiving the pushbutton 48 and the remaining portion of light or LED body 28 therethrough, so as to extend outwardly thereof for manual operation of the pushbutton 48 and visual observation of LED or light emitting means 20, respectively.

In accordance with a further feature of the invention, the pushbutton body also includes resilient or spring-like means in the form of a resilient, elongate outwardly extending member designated generally by reference numeral 54. This resilient or spring-like means 54 is upwardly bendable or deformable upon assembly of pushbutton body 40 with the housing portion 46, as indicated by arrow 56, to engage a complementary slots or apertures 58 and 59 in the pushbutton body 46 as best viewed in FIG. 4.

In operation, this resilient member 54 thus normally holds the pushbutton body in the second position illustrated in FIG. 3, that is, with the pushbutton 48 and light portion 28 fully outwardly extended with respect to apertures 50 and 52 in the housing portion and with leads 30 and 32 out of contact with contact elements 36 and 38. However, this spring-like or resilient member 54 is responsive to an opposing force 60 applied to the pushbutton body and particularly to pushbutton 48 for permitting movement of the pushbutton body to the first position as illustrated in FIG. 4. Some elastic deformation of resilent or spring-like element 54 will be noted in FIG. 4 in response to the movement of pushbutton body 42 caused by application of force 60 upon the pushbutton 48. Upon removal of this opposing force 60, the resilient or spring-like member 54 will again resiliently return to its position shown in FIG. 3 for thereby resiliently returning the pushbutton body to its second position illustrated therein.

As best viewed in FIG. 7, in the illustrated embodiment, the resilient or spring-like means or member 54 comprises a resiliently bendable elongate yoke-like member having a pair of spaced apart legs 62, 64, a substantially flat body portion 66 joining these legs and a pair of outwardly protruding tab means or members 68, 70 extending from an end of the body 66 opposite legs 62 and 64. Hence the elongate member 54 extends integrally laterally outwardly of the pushbutton body 42 and defines the tab means 68 and 78 at the outer end thereof. These tab means engage complementary formed slot means or apertures 58, 59 of the housing portion 42, as best viewed in FIG. 6. Hence, the elongate spring-like member 54 is upwardly resiliently bendable as indicated by arrow 56 for engagement of the tabs or tab means 68, 70 with the slots or slot means 58 and 59. To this end, the tabs or tab means 68 and 70 may include cammed or angled lead-in surfaces 68a, 70a to facilitate snapping engagement with slots 58 and 59.

In the illustrated embodiment, it will be noted that the tester body 10 comprises an upper body portion designated generally by reference numeral 80 and a lower body portion designated generally by reference numeral 82. The upper body portion 80 generally defines upper portions 12a and 16a of both the male and female connector portion 12 and 16. Similarly, the lower body portion 82 defines lower portions or sections 12b and 16b of the male and female connector portions respectively. The previously described housing portion 46 is also defined or formed in this lower body portion 82 immediately adjacent and below the female connector portion 16.

In the illustrated embodiment, the contact means or elongate spring wire connector members 36 and 38 each have a protruding or deformed portion extending generally downwardly or in the direction of the pushbutton body 42 and housing portion 46 therebelow. This downwardly deformed or protruding portion is designated generally by reference numeral 84. A through aperture 85 is provided through a top surface of the housing 46 to receive this portion 84 therethrough. Cooperatively, the previously mentioned guide means 34 comprises a projection on the pushbutton body 42 which extends generally upwardly or in the direction of this protruding portion 84. This is to guide an upwardly deformed or protruding portion 86 of respective leads 30 and 32 in a direction for engagement with the protruding portions 84 of the contacts 36, 38 when the pushbutton body 42 is moved to its first position as illustrated in FIG. 4.

It will be seen that the contacts or wire conductor members 36, 38 are bent or otherwise formed into substantially identical shapes. The structural portions of lower body portion 82 for cooperating with or receiving conductors 36 and 38 are also identical. Hence, only one conductor 36 and the cooperating portions of body portion 82 will be fully described. The conductor 36 has a generally L-shaped leading end 90 with respect to the direction of insertion of tester 10 into receptacle 14. This leading end 90 as best viewed in FIG. 3 extends into a groove 92 provided therefore at a leading internal surface of male connector portion 12 as best viewed in FIGS. 3 and 5 through 7. Immediately therebelow, an intermediate portion 94 of conductor 36 extends along an elongate opening or slot 95 along a bottom outer surface of male connector portion 12.

In order to reach female connector portion 16, an elongate groove or guide channel 96 is provided in a trailing portion of male connector portion 12 for receiving intermediate conductor portion 94. Thereafter, a substantially right angle bend in conductor 36 defines a further generally downwardly extending conductor portion 98. This portion 98 extends downwardly into the previously mentioned downwardly deformed or protruding portion 84 extending through aperture 85 as previously described. Thereupon conductor 36 again angles upwardly to form a final conductor portion 100 which projects somewhat upwardly of a bottom surface 106 of connector portion 16. This latter portion 100 is so formed so as to make contact with the corresponding tip or ring contact of the modular telephone plug 18. A final, downwardly bent portion 102 of conductor 36 extends into a slot or apertrue 104 provided therefore in the bottom surface 106 of female connector portion 16. It will be noted that surface 106 is defined by the top wall of the housing 46.

It will additionally be noted that free outer end portions 110 of respective leads 30 and 32 are received in slots or apertures 112 provided therefor in pushbutton body 42, immediately behind the upwardly projecting guide portion 34 thereof.

While particular embodiments of the invention have been shown and described in detail, it will be obvious to those skilled in the art that changes and modifications of the present invention in its various aspects may be made without departing from the invention in is broader aspects, some of which changes and modifications being matters of routine engineering or design, and others being apparent only after study. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

The invention is claimed as follows:

1. An in-line switched telephone tester apparatus comprising: a tester body defining a male connector portion of complementary configuration for insertion into a jack and a female connector portion of complementary configuration for receiving a plug; electrical contact means aligned with said male and female connector portions for engaging tip and ring contacts of said jack and said plug respectively; light emitting means having a light body and a pair of elongate leads; pushbutton means comprising a pushbutton body; mounting means for mounting said light body; and guide means for guiding said elongate leads into a predetermined alignment relative to said electrical contact means; said pushbutton body being movably mountable to said tester body for movement between a first position wherein said elongate leads are in electrically conductive contact with said electrical contact means and a second position wherein said elongate leads are out of electrically conductive contact with said electrical contact means.

2. An apparatus according to claim 1 wherein said light emitting means comprises a bipolar LED response to a voltage of one polarity thereacross for emitting light of a first color and responsive to a voltage of the opposite polarity thereacross for emitting light of a second color.

3. Apparatus according to claim 1 wherein said tester body defines a housing portion configured for slideably mounting said pushbutton body.

4. Apparatus according to claim 3 wherein said pushbutton body comprises an outwardly extending pushbutton; and wherein said mounting means comprises recess means in said pushbutton body of complementary configuration for receiving at least a portion of said light body therein with a remaining portion of said light body extending outwardly of said pushbutton body; and wherein said housing portion includes a pair of through apertures for slideably receiving said pushbutton and said light body remaining portion respectively therethrough and extending outwardly thereof for manual operation and visual observation, respectively.

5. Apparatus according to claim 1 wherein said pushbutton body further includes spring-like means for normally holding said pushbutton body in said second position, and responsive to an opposing force applied to said pushbutton body for permitting movement thereof to said first position and upon removal of said opposing force for resiliently returning said pushbutton body to said second position.

6. Apparatus according to claim 1 wherein said tester body comprises an upper body portion defining an upper portion of said male and female connector portions respectively and a lower body portion engageable with said upper body portion and defining lower portions of said male and female connector portions respectively.

7. Apparatus according to claim 6 wherein said lower body portion further defines a housing portion configured for slideably mounting said pushbutton body.

8. Apparatus according to claim 5 wherein said spring-like means comprises a resiliently bendable elongate member extending integrally laterally outwardly of said pushbutton body and having tab means at a free outer end thereof, and slot means in said housing portion generally above said pushbutton body when mounted therein; said elongate member being upwardly resiliently bendable for engagement of said tab means with said slot means.

9. Apparatus according to claim 3 wherein said housing portion is located adjacent said female connector portion and wherein said electrical contact means comprises a pair of flat, elongate spring wire conductor members extending respectively along a lower inner surface of said female connector portion and a lower outer surface of said male connector portion, respectively, and each having a protruding portion extending in the direction of said pushbutton body and said housing portion; and wherein said guide means includes a projection on said pushbutton body extending generally in the direction of said protruding contact means portions for guiding a portion of said elongate leads in a direction for engagement with said protruding contact means portions in response to movement of said pushbutton body to said first position.

10. A switched telephone tester comprising: a tester body defining a connector portion of complementary configuration for receiving a plug; light emitting means having a pair of leads and being responsive to a given voltage for emitting light and switching means movable to a first position for placing said pair of leads of said light emitting means in electrical circuit across a pair of contacts of said plug and a second position for taking said pair of leads of said light emitting means out of circuit across said contact wherein said switching means includes guide means for guiding said leads to said first and second positions to thereby test for the presence of a voltage across said contacts.

11. Apparatus according to claim 10 and further including electrical contact means mounted to said tester body and aligned with said connector portion for engaging tip and ring contacts of said modular telephone plug; and wherein said switching means comprises a pushbutton body including mounting means for mounting said light emitting means and defining said guide means thereon or guiding said pair of leads into a predetermined alignment relative to said electrical contact means; said pushbutton body being movable relative to said tester body to define said first position, wherein said leads are in electrically conductive contact with said electrical contact means, and to define said second position, wherein said leads are out of electrically conductive contact with said electrical contact means.

12. Apparatus according to claim 10 and further including spring-like means for normally holding said switching means in said second position, and responsive to an opposing force applied to said switching means for permitting movement thereof to said first position, and upon removal of said opposing force for resiliently returning said switching means to said second position.

13. Apparatus according to claim 10 wherein said switching means comprises a pushbutton body movably mountable to said tester body for movement between said first position and said second position; said pushbutton body including a protruding pushbutton and mounting means for receiving a portion of said light emitting means therein, a remaining portion of said light emitting means extending outwardly thereof; and wherein said tester body includes means for slideably receiving said pushbutton body with said pushbutton and said light emitting means remaining portion extending respectively outwardly of said tester body for manual operation and visual observation, respectively.

* * * * *